Aug. 9, 1927.

F. L. SCOTT 1,638,219

COUPLING LOOSENER

Filed May 25, 1922

F. L. Scott Inventor

By Jesse R. Stone

Attorney

Patented Aug. 9, 1927.

1,638,219

UNITED STATES PATENT OFFICE.

FLOYD L. SCOTT, OF HOUSTON, TEXAS, ASSIGNOR TO HUGHES TOOL COMPANY, OF HOUSTON, TEXAS, A CORPORATION OF TEXAS.

COUPLING LOOSENER.

Application filed May 25, 1922. Serial No. 563,471.

My invention relates to a means to loosen collars, unions, nuts and other coupling means when such couplings become corroded or shrunk, or for other reasons, cannot be readily unscrewed. It is especially adapted to remove couplings from pipes of various diameters when they become "frozen" on the pipe.

An object of my invention is to provide a light and portable means for removing couplings from pipes, rods, etc. without injuring the threads on the said pipe or rod.

Another object is to provide a coupling loosener of the type referred to which will be adjustable for different sizes of pipe and which will most efficiently perform the service.

Figure 1:
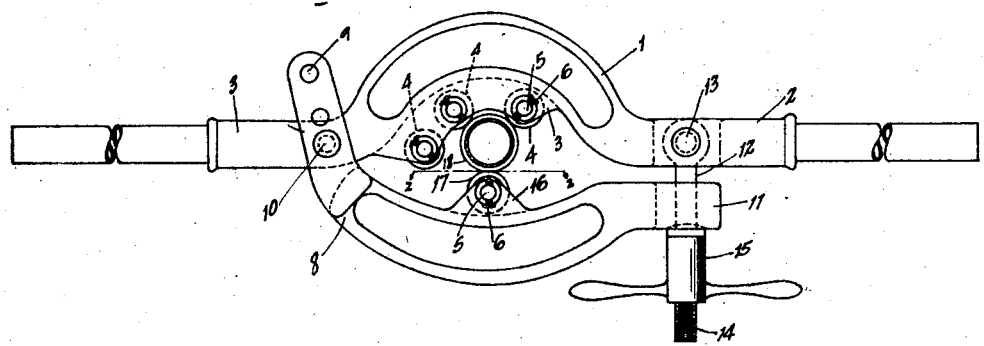
Figure 2:
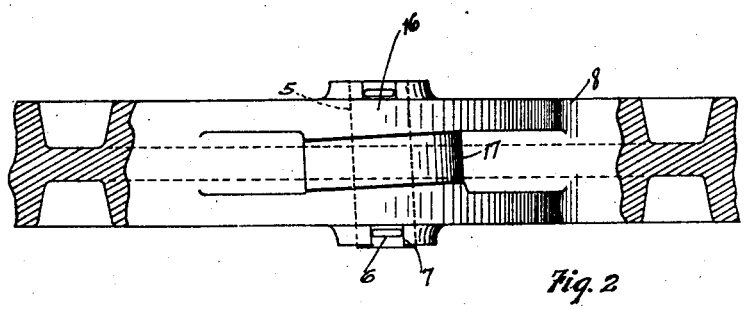
Figure 3:
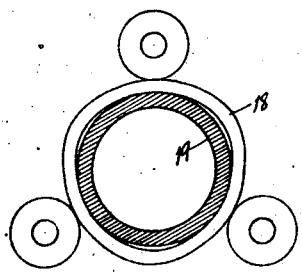

In the drawing herewith, wherein like numerals of references are applied to like parts in all the views, Fig. 1 is a top plan view of my invention illustrating the same applied to a pipe. Fig. 2 is a broken detail showing the roller on the pivoted jaw and Fig. 3 is a diagrammatical view illustrating the manner in which the device operates to loosen the coupling.

It frequently happens in unscrewing joints of pipe that the couplings are found very much corroded, or it may happen that, due to heat or rough service, the couplings have become shrunken somewhat, so that it is almost impossible to unscrew the coupling in the usual manner. In some cases the coupling can be loosened by continuous hammering, but this method is unsatisfactory due to the large amount of labor necessary and also because the pipe is itself often broken and mutilated in the process. I have found that the coupling may be expanded and thereby loosened from the pipe if the outer surface thereof is subjected to a rolling action of a series of rollers clamped tightly to the pipe. In this manner the coupling may be expanded and removed without injury to the threads of the pipe.

In the embodiment of my invention shown in the drawings I have illustrated a device of this character which is easily portable, so that it may be used in the oil field, or at the point where the pipe is located. The tool is adapted to be operated by hand without much labor or expense. The body of my device comprises a central yoke 1 segmental in shape in its central portion and having two oppositely extending handles 2 and 3 thereon. These handles may be made of pipe for greater lightness and may be extended laterally for sufficient distance to provide sufficient leverage so that the central yoke may be rotated on the work as will be later described.

The inner concave face of the yoke 1 is provided with upper and lower spaced plates or lugs 3 between which may be placed a plurality of cylindrical rollers 4. These rollers are approximately disc shaped and are adapted to roll upon bearing pins 5 extending through the plates 3 and held against removal relative to the said plates by means of cotter pins 6 extending through the ends of the pins and through bosses 7 in the sides of the yoke in the manner shown in Fig. 2. The rollers 4 upon the yoke may be two or more in number and are so formed and placed as to engage couplings of different diameter. I have shown three of such rollers. The pivoting pins 5 upon which they are mounted are inclined slightly from the perpendicular axis of the coupling which is to be engaged by the said rollers so as to cause the rollers to move longitudinally of the coupling in a spiral direction similar to the action of the screw, as the device is rotated around the coupling.

Pivoted to one side of the central segmental portion of the yoke 1 is a curved jaw 8. The hinged end of this jaw is formed with a plurality of spaced openings 9 therein to receive a pivotal pin 10 by means of which it is secured to the yoke. It will be obvious that the jaw may be adjusted by means of the pivotal pin 10 in any of the desired openings 9 to receive the size of pipe coupling which is to be operated upon. The other forward end 11 of the jaw 8 is adapted to be adjustably secured to the other end of the yoke. This is done by forming said end 11 with a central slot forming a fork to receive a bolt 12 pivoted at one end of the yoke 1 by means of a pin 13. The outer end of the bolt 12 is threaded at 14 to receive a clamping nut 15 by means of which the forward end 11 of the jaw may be engaged and forced toward the yoke in such manner as to clamp the pipe coupling.

To engage the said coupling the inner concave face of the jaw is provided with two inwardly extending ears 16 between which is secured a roller 17 similar in all respects to the rollers 4 previously described. The roller 17 rolls upon a bearing pin 5 secured in place between the ears 16 by means of a cotter pin 6. This bearing pin is also inclined in the same relative direction as are the bearing pins of the opposite rollers. This is shown particularly in Fig. 2.

In the operation of my device the jaw 8 is adjusted on its pivot 10 to accommodate the size of coupling to be operated upon, and it will be obvious that the adjustability of the device to the coupling may be secured to some extent by means of the clamping nut 15 on the bolt 12; thus for slight differences in the diameter no adjustment at the pivot 10 will be necessary, such variations being accommodated by the adjusting nut 15. When the rollers have been clamped tightly against the coupling at one end thereof, the device may be rotated about the pipe so as to cause the rollers to mash into the pipe coupling somewhat and to act to roll it out to decrease its thickness. The inclination of the rollers all in the same forward direction will cause the rollers to travel down along the pipe coupling, as the device is rotated, and thus subject the whole outer surface of the coupling to this rolling action. In Fig. 3 I have shown in a somewhat exaggerated view the manner in which the rollers 4 and 17 act upon the coupling. In this view the coupling is designated by the numeral 18 and the pipe by the numeral 19. As the rollers are clamped tightly against the coupling and are forced to roll on the coupling by the rotation of the device, the thickness of the coupling will be decreased somewhat, thus increasing the diameter of the coupling, forcing it slightly outward away from the pipe in front of each roller. When the entire coupling has been subjected to this treatment it will be found that the coupling has expanded outwardly away from the pipe a sufficient distance to loosen the same, and in ordinary cases the coupling may be unscrewed by hand without the necessity of applying a wrench thereto.

The advantages of this type of tool over the ordinary methods now employed in the field in pipe line operation and in well drilling will be appreciated by one skilled in the art and who is familiar with the difficulties which must be overcome. The tool may be easily applied to the coupling to be unscrewed and the expanding of the coupling may be quickly performed. In some cases the coupling itself may be somewhat mutilated, but the pipe to which the coupling is applied will not be injured in any way. The forming of the yoke with a series of rollers properly positioned on the said yoke will enable the operator to use the same on widely varying diameters of pipe. In Fig. 1 the device is shown as applied to a coupling of small diameter and it is obvious that this diameter may be appreciably larger before it will be necessary to engage the coupling with the two outer rollers shown on the yoke in cooperation with the roller 17 on the jaw. The device is therefore easily applied and operated and may be adjusted to varying sizes of pipe, such as may be encountered in the field.

Having thus described my invention, the further objects and advantages of which will be apparent to one skilled in the art, what I claim as new and desire to protect by Letters Patent is:

1. In a device of the character described, a segmental yoke having operating handles extending laterally therefrom, a curved jaw pivoted at one of its ends to one end of said yoke, the opposite end of said jaw being adjustably secured to the other end of said yoke and cooperating rollers on the concave faces of said jaw and yoke to engage a pipe coupling.

2. In a device of the character described, a segmental yoke having operating handles extending laterally therefrom, a curved jaw pivoted at one of its ends to one end of said yoke, the opposite end of said jaw being adjustably secured to the other end of said yoke and cooperating rollers on the concave faces of said jaw and yoke to engage a pipe coupling, said rollers being mounted on axes inclined slightly relative to the longitudinal axes of said coupling.

3. In a device of the character described, an arcuate yoke having bearings on its concave face, rollers mounted in said bearings at a slight angle relative to said yoke, a cooperating jaw having one end shaped for adjustable connection to said yoke, means to clamp the opposite end of said jaw toward said yoke and radial handles by means of which said device may be rotated about the work.

4. In a portable device for loosening couplings, a frame adapted to be clamped about the coupling, rollers on said frame positioned to roll on said coupling when said frame is clamped in position and laterally extending handles to rotate said frame on said coupling and to cause the movement of said frame and said rollers from end to end of said coupling.

5. A portable device for loosening couplings from pipes comprising a yoke, rollers mounted on said yoke to engage a pipe coupling at an angle inclined slightly relative to the axis of said coupling, means on said yoke to clamp it in position with said rollers engaging said coupling, and handles on said yoke to rotate said yoke and move it longitudinally of said coupling.

In testimony whereof, I hereunto affix my signature, this the 22nd day of May, A. D. 1922.

FLOYD L. SCOTT.